UNITED STATES PATENT OFFICE.

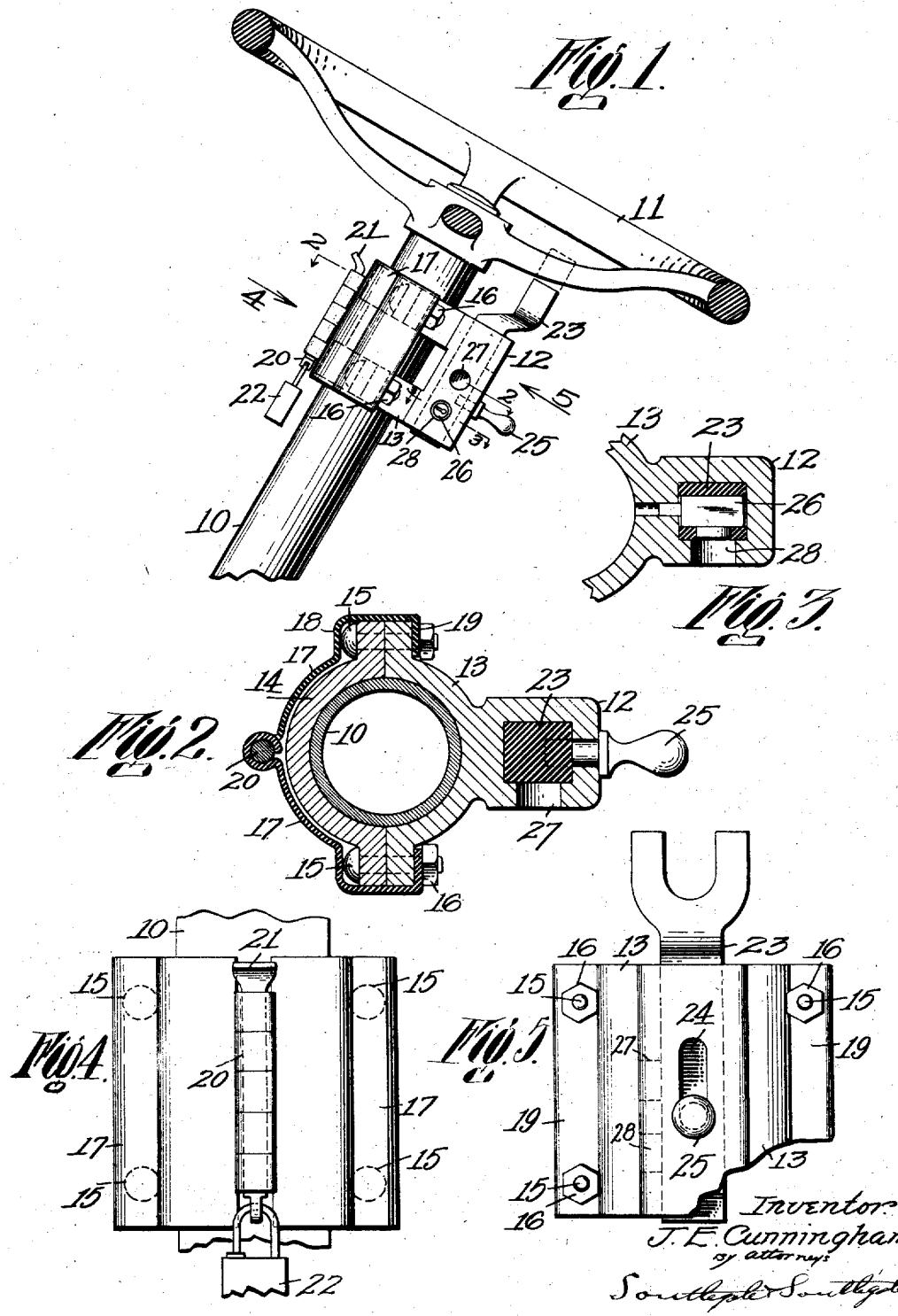

JAMES E. CUNNINGHAM, OF WORCESTER, MASSACHUSETTS.

AUTOMOBILE-LOCK.

1,257,322.   Specification of Letters Patent.   Patented Feb. 26, 1918.

Application filed June 5, 1917. Serial No. 173,031.

*To all whom it may concern:*

Be it known that I, JAMES E. CUNNINGHAM, a citizen of the United States, residing at Worcester, in the county of Worcester and State of Massachusetts, have invented a new and useful Automobile-Lock, of which the following is a specification.

This invention relates to a device for locking automobiles to prevent their being started and operated by unauthorized persons.

The principal objects of the invention are to provide means whereby a locking bolt for engaging the steering wheel can be secured in its locking position and locked there in a simple and convenient way; means whereby the locking mechanism for the bolt can be secured to the steering column and its removal or displacement effectually prevented; and to provide improvements in details of the same.

Reference is to be had to the accompanying drawings, in which—

Figure 1 is a side view of the steering column of an automobile with a preferred form of this invention applied thereto;

Fig. 2 is a sectional view of the column and lock on enlarged scale on the line 2—2 of Fig. 1;

Fig. 3 is a sectional view on the line 3—3 of Fig. 1;

Fig. 4 is a front elevation looking in the direction of the arrow 4 in Fig. 1, and Fig. 5 is a rear elevation looking in the direction of the arrow 5 in Fig. 1.

The invention is shown as applied to a steering column 10 which carries a steering wheel 11 connected with a steering shaft as usual. On this column is mounted a lock casing 12 shown as having two semi-circular supporting members 13 having radial end flanges at the ends. These with a pair of semi-circular rings 14 constitute complete clamps surrounding the column 10 by which the lock casing is secured to this column.

These members 13 and 14 are secured together by means of bolts 15 and clamped in position by nuts 16 as will be obvious. One of the difficulties encountered with this class of locks is the fact that it is extremely difficult to provide any way to clamp the parts on the column without leaving it so that they can be loosened in a comparatively easy manner. This difficulty is avoided in this invention by the use of two stiff sheet metal plates 17. Each of these has a portion 18 coming under the heads of the two bolts and extending around the ends of the two radial flanges of the members 13 and 14. At the edges they terminate in inwardly extending flanges 19 which are perforated to pass over the bolts and receive them in the perforations. Then the bolts 15 project some distance through the perforations and the nuts are put on outside of the flanges 19 so as to secure these flanges down on the oppositely projecting flanges of the members 13. The two members 17 are provided with alined alternate passages through which a casing locking bolt 20 is adapted to pass. This bolt is bent up at one end as at 21 and the other end is provided with a perforation for the hasp of a padlock 22 so that these parts can be locked together by means of this padlock.

In connection with this part of the invention it is to be understood that in assembling, the bolts 15 are first placed in position. Then the members 17 are passed over the projecting ends of the bolts so that the bolts project through the perforations therein. Then they can be swung inwardly toward each other to engage over the heads of the bolts as shown in Fig. 2. After this is accomplished the bolt 20 is placed in position and locked. Then the nuts 16 are applied. When the parts are in this position of course the nuts 16 can be removed very readily, but the casings 17 are sufficiently stiff so that it is impossible to bend up the flanges 19 and thus remove these casings from the bolts. Furthermore, on account of the shape and location of the surfaces 18 it is impossible to force the bolts back.

The lock casing 12 is of very simple construction. It is spaced slightly from the steering column between the two members 13 which are integral with it. It has a passage shown as extending all the way through it for the wheel locking bolt 23, and it also has a slot 24 for the handle 25 by which the locking bolt is manipulated. This bolt itself is provided with a lock 26 and the casing has two openings 27 and 28 through one side so as to provide access for a key to this locking both when the bolt is in its locking position and in its idle position. Thus the bolt can be locked in either place and its vibration prevented. The bolt of the lock 26 preferably passes into the base of the casing 12 toward the column where it cannot be tampered with.

In this way, it will be seen that the main locking bolt 23 can be secured in either of its extreme positions, that its bifurcated end is adapted to engage the spoke of the steering wheel and securely hold it in position, and that this part of the device is simple and can be made as small as is consistent with a good stiff bolt. In other words, it is not bulky and does not take up any unnecessary room.

Although I have illustrated and described only a single form of the invention, I am aware of the fact that modifications can be made therein by any person skilled in the art without departing from the scope of the invention as expressed in the claims. Therefore I do not wish to be limited to all the details of construction herein shown and described, but what I do claim is—

1. In a device of the character described, the combination of a casing, a bolt carried thereby for engaging a steering wheel and locking it in position, means for locking said bolt in position, said casing having a slot therethrough, a handle extending through said slot for operating the bolt, said casing having a pair of semi-circular supporting members adapted to fit against the steering column, a pair of semi-circular members adapted to register therewith, bolts for securing said members together to clamp the casing around the column, two members for preventing the displacement of the last named bolts, and means separate from the bolt for holding said members in position.

2. In a device of the character described, the combination of a casing, a bolt carried thereby for engaging a steering wheel and locking it, said casing having a pair of supporting members adapted to fit against the steering column, a pair of members adapted to register therewith, bolts for securing said members together to clamp the casing around the column, and a pair of pivotally connected casings for engaging and preventing the displacement of the last named bolts.

3. In an automobile lock, the combination of a lock casing, a bolt therein for engaging a steering wheel and locking it in position, said casing having a pair of semi-circular supporting members adapted to fit against the steering column, a pair of semi-circular members adapted to register therewith, bolts for securing said members together to clamp the casing to the column, a pair of metal casings adapted to engage the outer ends of said bolts, and means for locking said casings in position to prevent displacement of the bolts.

4. In a device of the character described, the combination of a lock for locking the steering wheel of an automobile having a pair of members extending therefrom having opposite radial flanges, another pair of members coöperating with them to constitute clamps to clamp said lock to the steering column, bolts passing through said flanges for securing them together, and two members pivotally connected together and having surfaces for limiting the inward positions of said bolts and provided with opposite flanges having perforations adapted to receive the bolts on the other side and prevent displacement thereof.

5. In a device of the character described, the combination of a lock for locking the steering wheel of an automobile, said lock having a pair of members extending therefrom of a general semi-circular shape and having opposite radial flanges, another pair of members of similar shape coöperating with them to constitute clamps to clamp said lock to the steering column, bolts passing through said flanges for securing them together on the steering column, and a pair of sheet metal members adapted to be secured together at a point opposite said lock and having surfaces for limiting the inward positions of said bolts and provided with end flanges having perforations adapted to receive the bolts on the other side and prevent displacement thereof.

6. In a device of the character described, the combination of a lock for locking the steering wheel of an automobile, said lock having a pair of members extending therefrom having opposite radial flanges, another pair of members having a pair of similar flanges, bolts passing through said flanges for securing the members together on the steering column, a pair of sheet metal members adapted to be secured together at a point opposite said lock, having surfaces for limiting the inward positions of said bolts, and provided with perforated end flanges adapted to receive the bolts on the other side and prevent displacement thereof, a locking bolt adapted to pass through the said members to secure them together on the front, and a lock for securing said locking bolt in position.

In testimony whereof I have hereunto affixed my signature.

JAMES E. CUNNINGHAM.